United States Patent
Bedekar et al.

(10) Patent No.: US 11,924,861 B2
(45) Date of Patent: Mar. 5, 2024

(54) RESOURCE ALLOCATION POLICY SIGNALING

(71) Applicant: Nokia Solutions and Networks Oy, Espoo (FI)

(72) Inventors: Anand Bedekar, Glenview, IL (US); Shivanand Kadadi, Bangalore (IN); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/963,282

(22) PCT Filed: Jan. 18, 2018

(86) PCT No.: PCT/EP2018/051248
§ 371 (c)(1),
(2) Date: Jul. 20, 2020

(87) PCT Pub. No.: WO2019/141370
PCT Pub. Date: Jul. 25, 2019

(65) Prior Publication Data
US 2021/0377948 A1    Dec. 2, 2021

(51) Int. Cl.
*H04W 72/00*    (2023.01)
*H04W 48/10*    (2009.01)
(Continued)

(52) U.S. Cl.
CPC .......... *H04W 72/53* (2023.01); *H04W 48/10* (2013.01); *H04W 72/56* (2023.01); *H04W 92/10* (2013.01); *H04W 92/12* (2013.01)

(58) Field of Classification Search
CPC . H04W 72/0493; H04W 48/10; H04W 72/10; H04W 92/10; H04W 92/12
See application file for complete search history.

(56) References Cited

U.S. PATENT DOCUMENTS 10,306,696 B2 * 5/2019 Lee ........................ H04W 48/16
2006/0195576 A1 * 8/2006 Rinne ..................... H04L 47/70
709/226
(Continued)

FOREIGN PATENT DOCUMENTS

CN    101278595 A    10/2008
CN    102106178 A    6/2011
(Continued)

OTHER PUBLICATIONS

Sesia, Stefania, et al., "LTE—The UMTS Long Term Evolution: From Theory To Practice, Section 6—Introduction to Downlink Physical Layer Design", pp. 135-140, Apr. 2009 John Wiley & Sons, Ltd.

*Primary Examiner* — Lakeram Jangbahadur
(74) *Attorney, Agent, or Firm* — Harrington & Smith

(57) ABSTRACT

An apparatus including an input configured to receive at least one notification from at least one radio access network node controller, the at least one notification caused to notify the apparatus of at least one physical channel assignment policy indication; an assigner configured to implement at least one physical channel assignment based on the at least one physical channel assignment policy indication; an output configured to generate and transmit at least one assignment notification to at least one user equipment associated with the apparatus, the assignment notification caused to notify the at least one user equipment of the at least one physical channel assignment.

18 Claims, 6 Drawing Sheets

(51) Int. Cl.
*H04W 72/53* (2023.01)
*H04W 72/56* (2023.01)
H04W 92/10 (2009.01)
H04W 92/12 (2009.01)

(56) References Cited

U.S. PATENT DOCUMENTS

| | | | | |
|---|---|---|---|---|
| 2010/0329198 | A1* | 12/2010 | Madan | H04W 72/1242 |
| | | | | 370/329 |
| 2016/0057723 | A1* | 2/2016 | Horn | H04W 76/28 |
| | | | | 455/435.2 |
| 2017/0064765 | A1* | 3/2017 | Lee | H04W 76/19 |
| 2017/0290027 | A1* | 10/2017 | Brunel | H04W 72/1289 |
| 2017/0311169 | A1* | 10/2017 | Cai | H04L 27/0006 |
| 2017/0338908 | A1* | 11/2017 | Chebib | H04L 1/18 |
| 2018/0295540 | A1* | 10/2018 | Akkarakaran | H04L 5/0053 |
| 2021/0297199 | A1* | 9/2021 | Miao | H04L 1/1896 |

FOREIGN PATENT DOCUMENTS

| | | |
|---|---|---|
| CN | 103098536 A | 5/2013 |
| CN | 106664517 A | 5/2017 |

* cited by examiner

US 11,924,861 B2

RESOURCE ALLOCATION POLICY SIGNALING

CROSS REFERENCE TO RELATED APPLICATION

This patent application is a U.S. National Stage application of International Patent Application Number PCT/EP2018/051248 filed Jan. 18, 2018, which is hereby incorporated by reference in its entirety.

FIELD

The present application relates to a method, apparatus, system and computer program and in particular but not exclusively to a method and apparatus for radio access network management, in particular but not only for radio resource management (RRM) functions within a 3GPP communications network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio), long-term evolution (LTE) of the Universal Mobile Telecommunications System (UMTS), and now 5G New Radio (NR) radio-access technology. 5G NR is being standardized by the 3rd Generation Partnership Project (3GPP).

Operators of such networks would benefit from the ability to optimize the behaviour and performance of the radio access network (RAN), by being able to employ Controllers that can interact with the RAN using suitable interfaces and furthermore employ RAN elements which may interact with user equipment using their own suitable interfaces.

SUMMARY

According to an aspect, there is provided an apparatus comprising: an input configured to receive at least one notification from at least one radio access network node controller, the at least one notification caused to notify the apparatus of at least one physical channel assignment policy indication; an assigner configured to implement at least one physical channel assignment based on the at least one physical channel assignment policy indication; an output configured to generate and transmit at least one assignment notification to at least one user equipment associated with the apparatus, the assignment notification caused to notify the at least one user equipment of the at least one physical channel assignment.

The input may be configured to receive a notification comprising at least one of: an indicator conveying to the apparatus the at least one physical channel assignment policy indication; an indicator conveying to the apparatus an urgency factor for the at least one physical channel assignment.

The input configured to receive the notification comprising the indicator conveying to the apparatus the at least one physical channel assignment policy indication may comprise at least one of: an indicator for minimizing a number of consumed physical resource blocks for the at least one physical channel assignment; an indicator for maximal filling of consumed physical resource blocks for the at least one physical channel assignment; an indicator for equally loading consumed physical resource blocks for the at least one physical channel assignment; an indicator for minimizing worst-case intra-cell interference for consumed physical resource blocks for the at least one physical channel assignment; an indicator for minimizing fragmentation of consumed physical resource blocks for the at least one physical channel assignment; an indicator for minimize radio resource control reconfigurations for the at least one physical channel assignment; an indicator indicating that at least a first physical resource block is not allowed to be used for the at least one physical channel assignment; and an indicator indicating that at least a second physical resource block is allowed to be used for the at least one physical channel assignment.

The indicator conveying to the apparatus an urgency factor for the at least one physical channel assignment may comprise one of: an indicator for indicating an assignment is to be performed immediately; and an indicator for indicating an assignment is to be performed after a determined time.

The apparatus caused to support at least one physical channel assignment based on the at least one physical channel assignment policy indication may be caused to assign and/or reassign at least one physical channel physical resource block to at least one of: a new user equipment associated with the apparatus; and an existing user equipment associated with the apparatus.

The assigner configured to implement at least one physical channel assignment based on the at least one physical channel assignment policy indication may be configured to implement at least one of: assign and/or reassign at least one physical channel resource to an available physical resource block with a highest number of currently allocated physical resource allocations; assign and/or reassign at least one physical channel resource to an available physical resource block with a lowest number of currently allocated physical resource allocations; assign and/or reassign at least one physical channel resource to an available physical resource block to attempt to equalize currently allocated physical resource allocations between all available physical resource blocks; assign and/or reassign at least one physical channel resource to an available physical resource block which is contiguous with a currently used physical resource block; assign and/or reassign at least one physical channel resource to an available physical resource block after a determined number of assignments and/or reassignments is detected.

The output configured to generate and transmit at least one assignment notification may be configured to: generate and broadcast system information broadcast message, the system information broadcast message comprising information associated with the at least one physical channel assignment; and generate and broadcast a paging message, the paging message caused to notify the at least one user equipment of the system information broadcast message.

The output configured to generate and transmit at least one assignment notification may be configured to: generate and unicast a radio resource control message to a user equipment, the radio resource control message comprising information associated with the at least one physical channel assignment.

The at least one physical channel may comprise at least one of: a physical uplink control channel; a physical uplink data channel; a physical downlink control channel; a physical downlink data channel; and a random access channel.

According to a second aspect there is provided a method comprising: supporting a first interface, the first interface being from at least one radio access network node controller to an apparatus and caused to notify the apparatus of at least one physical channel assignment policy indication; supporting at least one physical channel assignment based on the at least one physical channel assignment policy indication; supporting a second interface, the second interface being from the apparatus to at least one user equipment associated with the apparatus, the second interface caused to provide a notification regarding the at least one physical channel assignment.

Supporting a first interface, the first interface being from at least one radio access network node controller to the apparatus and caused to notify the apparatus of at least one physical channel assignment policy indication may comprise supporting at least one of: conveying an indicator to the apparatus the at least one physical channel assignment policy indication; conveying an indicator to the apparatus an urgency factor for the at least one physical channel assignment.

Supporting conveying the indicator to the apparatus the at least one physical channel assignment policy indication may comprise supporting conveying at least one of: an indicator for minimizing a number of consumed physical resource blocks for the at least one physical channel assignment; an indicator for maximal filling of consumed physical resource blocks for the at least one physical channel assignment; an indicator for equally loading consumed physical resource blocks for the at least one physical channel assignment; an indicator for minimizing worst-case intra-cell interference for consumed physical resource blocks for the at least one physical channel assignment; an indicator for minimizing fragmentation of consumed physical resource blocks for the at least one physical channel assignment; an indicator for minimizing radio resource control reconfigurations for the at least one physical channel assignment; an indicator indicating that at least a first physical resource block is not allowed to be used for the at least one physical channel assignment; and an indicator indicating that at least a second physical resource block is allowed to be used for the at least one physical channel assignment.

Supporting indicator conveying to the apparatus an urgency factor for the at least one physical channel assignment may comprise supporting one of: an indicator for indicating an assignment is to be performed immediately; and an indicator for indicating an assignment is to be performed after a determined time.

Supporting at least one physical channel assignment based on the at least one physical channel assignment policy indication may comprise assigning and/or reassigning at least one physical channel physical resource block to at least one of: a new user equipment associated with the apparatus; and an existing user equipment associated with the apparatus.

Supporting at least one physical channel assignment based on the at least one physical channel assignment policy indication may comprise at least one of: assigning and/or reassigning at least one physical channel resource to an available physical resource block with a highest number of currently allocated physical resource allocations; assigning and/or reassigning at least one physical channel resource to an available physical resource block with a lowest number of currently allocated physical resource allocations; assigning and/or reassigning at least one physical channel resource to an available physical resource block to attempt to equalize currently allocated physical resource allocations between all available physical resource blocks; assigning and/or reassigning at least one physical channel resource to an available physical resource block which is contiguous with a currently used physical resource block; assigning and/or reassigning at least one physical channel resource to an available physical resource block after a determined number of assignments and/or reassignments is detected.

Supporting a second interface, the second interface being from the apparatus to at least one user equipment associated with the apparatus, the second interface caused to implement the at least one physical channel assignment may comprise: generating and broadcasting at least one system information broadcast message, the system information broadcast message comprising information associated with the at least one physical channel assignment; and generating and broadcasting at least one paging message, the paging message caused to notify the at least one user equipment of the system information broadcast message.

Supporting a second interface, the second interface being from the apparatus to at least one user equipment associated with the apparatus, the second interface caused to implement the at least one physical channel assignment may comprise: generating and unicasting a radio resource control message to a user equipment, the radio resource control message comprising information associated with the at least one physical channel assignment.

The at least one physical channel may comprise at least one of: a physical uplink control channel; a physical uplink data channel; a physical downlink control channel; a physical downlink data channel; and a random access channel.

According to a third aspect there is provided an apparatus comprising: means for supporting a first interface, the first interface being from at least one radio access network node controller to an apparatus and caused to notify the apparatus of at least one physical channel assignment policy indication; means for supporting at least one physical channel assignment based on the at least one physical channel assignment policy indication; means for supporting a second interface, the second interface being from the apparatus to at least one user equipment associated with the apparatus, the second interface caused to provide a notification regarding the at least one physical channel assignment.

The means for supporting a first interface, the first interface being from at least one radio access network node controller to the apparatus and caused to notify the apparatus of at least one physical channel assignment policy indication may comprise means for supporting at least one of: conveying an indicator to the apparatus the at least one physical channel assignment policy indication; conveying an indicator to the apparatus an urgency factor for the at least one physical channel assignment.

The means for supporting conveying the indicator to the apparatus the at least one physical channel assignment policy indication may comprise means for supporting conveying at least one of: an indicator for minimizing a number of consumed physical resource blocks for the at least one physical channel assignment; an indicator for maximal filling of consumed physical resource blocks for the at least one physical channel assignment; an indicator for equally loading consumed physical resource blocks for the at least one physical channel assignment; an indicator for minimizing worst-case intra-cell interference for consumed physical resource blocks for the at least one physical channel assignment; an indicator for minimizing fragmentation of consumed physical resource blocks for the at least one physical channel assignment; an indicator for minimize radio resource control reconfigurations for the at least one physical channel assignment; an indicator indicating that at least a first physical resource block is not allowed to be used for the at least one physical channel assignment; and an indicator indicating that at least a second physical resource block is allowed to be used for the at least one physical channel assignment.

The means for supporting an indicator conveying to the apparatus an urgency factor for the at least one physical channel assignment may comprise means for supporting one of: an indicator for indicating an assignment is to be performed immediately; and an indicator for indicating an assignment is to be performed after a determined time.

The means for supporting at least one physical channel assignment based on the at least one physical channel assignment policy indication may comprise means for assigning and/or reassigning at least one physical channel physical resource block to at least one of: a new user equipment associated with the apparatus; and an existing user equipment associated with the apparatus.

The means for supporting at least one physical channel assignment based on the at least one physical channel assignment policy indication comprises at least one of: means for assigning and/or reassigning at least one physical channel resource to an available physical resource block with a highest number of currently allocated physical resource allocations; means for assigning and/or reassigning at least one physical channel resource to an available physical resource block with a lowest number of currently allocated physical resource allocations; means for assigning and/or reassigning at least one physical channel resource to an available physical resource block to attempt to equalize currently allocated physical resource allocations between all available physical resource blocks; means for assigning and/or reassigning at least one physical channel resource to an available physical resource block which is contiguous with a currently used physical resource block; means for assigning and/or reassigning at least one physical channel resource to an available physical resource block after a determined number of assignments and/or reassignments is detected.

The means for supporting a second interface, the second interface being from the apparatus to at least one user equipment associated with the apparatus, the second interface caused to implement the at least one physical channel assignment may comprise: means for generating and broadcasting at least one system information broadcast message, the system information broadcast message comprising information associated with the at least one physical channel assignment; and means for generating and broadcasting at least one paging message, the paging message caused to notify the at least one user equipment of the system information broadcast message.

The means for supporting a second interface, the second interface being from the apparatus to at least one user equipment associated with the apparatus, the second interface caused to implement the at least one physical channel assignment may comprise: means for generating and unicasting a radio resource control message to a user equipment, the radio resource control message comprising information associated with the at least one physical channel assignment.

The at least one physical channel may comprise at least one of: a physical uplink control channel; a physical uplink data channel; a physical downlink control channel; a physical downlink data channel; and a random access channel.

According to a fourth aspect there is provided an apparatus comprising at least one processor and at least one memory including computer code for one or more programs, the at least one memory and the computer code configured, with the at least one processor, to cause the apparatus at least to: support a first interface, the first interface being from at least one radio access network node controller to the apparatus and caused to notify the apparatus of at least one physical channel assignment policy indication; support at least one physical channel assignment based on the at least one physical channel assignment policy indication; support a second interface, the second interface being from the apparatus to at least one user equipment associated with the apparatus, the second interface caused to provide a notification regarding the at least one physical channel assignment.

The apparatus caused to support a first interface, the first interface being from at least one radio access network node controller to the apparatus and caused to notify the apparatus of at least one physical channel assignment policy indication may be caused to support at least one of: an indicator conveying to the apparatus the at least one physical channel assignment policy indication; an indicator conveying to the apparatus an urgency factor for the at least one physical channel assignment.

The apparatus caused to support the indicator conveying to the apparatus the at least one physical channel assignment policy indication may be caused to support at least one of: an indicator for minimizing a number of consumed physical resource blocks for the at least one physical channel assignment; an indicator for maximal filling of consumed physical resource blocks for the at least one physical channel assignment; an indicator for equally loading consumed physical resource blocks for the at least one physical channel assignment; an indicator for minimizing worst-case intra-cell interference for consumed physical resource blocks for the at least one physical channel assignment; an indicator for minimizing fragmentation of consumed physical resource blocks for the at least one physical channel assignment; an indicator for minimize radio resource control reconfigurations for the at least one physical channel assignment; an indicator indicating that at least a first physical resource block is not allowed to be used for the at least one physical channel assignment; and an indicator indicating that at least a second physical resource block is allowed to be used for the at least one physical channel assignment.

The apparatus caused to support indicator conveying to the apparatus an urgency factor for the at least one physical channel assignment may be caused to support one of: an indicator for indicating an assignment is to be performed immediately; and an indicator for indicating an assignment is to be performed after a determined time.

The apparatus caused to support at least one physical channel assignment based on the at least one physical channel assignment policy indication may be caused to assign and/or reassign at least one physical channel physical resource block to at least one of: a new user equipment associated with the apparatus; and an existing user equipment associated with the apparatus.

The apparatus caused to support at least one physical channel assignment based on the at least one physical channel assignment policy indication may be caused to assign and/or reassign at least one physical channel physical resource according to at least one of: assign and/or reassign at least one physical channel resource to an available physical resource block with a highest number of currently allocated physical resource allocations; assign and/or reassign at least one physical channel resource to an available physical resource block with a lowest number of currently allocated physical resource allocations; assign and/or reassign at least one physical channel resource to an available physical resource block to attempt to equalize currently allocated physical resource allocations between all available physical resource blocks; assign and/or reassign at least one physical channel resource to an available physical resource block which is contiguous with a currently used physical resource block; assign and/or reassign at least one physical channel resource to an available physical resource block after a determined number of assignments and/or reassignments is detected.

The apparatus caused to support a second interface, the second interface being from the apparatus to at least one user equipment associated with the apparatus, the second interface caused to implement the at least one physical channel assignment may be caused to: generate and broadcast system information broadcast message, the system information broadcast message comprising information associated with the at least one physical channel assignment; and generate and broadcast a paging message, the paging message caused to notify the at least one user equipment of the system information broadcast message.

The apparatus caused to support a second interface, the second interface being from the apparatus to at least one user equipment associated with the apparatus, the second interface caused to implement the at least one physical channel assignment may be caused to: generate and unicast a radio resource control message to a user equipment, the radio resource control message comprising information associated with the at least one physical channel assignment.

The at least one physical channel may comprise at least one of: a physical uplink control channel; a physical uplink data channel; a physical downlink control channel; a physical downlink data channel; and a random access channel.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

There is a need for designing a controller, radio access network (RAN) and user equipment (UE) interfaces such as application programming interfaces (APIs) which enable a RAN (eNB or gNB or Cloud RAN) to receive a communication (control message) from the controller indicating that the RAN should modify the size or number of resources available to use for physical control channels, such as the physical uplink control channel (PUCCH) or physical downlink control channel (PDCCH) or the random access channel (RACH) and furthermore enable the RAN to take various actions in order to realize the requested resizing of the physical control channels. Thus for example the system as described in further detail in the following embodiments shows how to inform UEs in the cell to know that the RAN is about to change PUCCH or PDCCH or RACH size, and lead to consistent behaviour within the cell. Thus for example consistent behaviour may be maintained even if the RAN is to decrease the PUCCH or PDCCH or RACH size. The implementation furthermore are configured to implement controls to significantly improve on impact times taken to resize the control channels such as the PUCCH. For example in some embodiments where the PUCCH resources are fragmented or sub-optimally packed the control of the PUCCH resources to reach a practical minimization of the time it taken for the RAN to implement a requested change in the PUCCH size.

This the implementations as described hereafter show apparatus and methods where the RAN is configured to receive a notification from a controller to change the PUCCH size (or other channel allocation) and where the RAN is configured to notify all UEs in an appropriate fashion, and take appropriate actions that will help minimize the time taken to change the PUCCH size and optimize the PUCCH allocations within the updated PUCCH size.

Target uses include Optimization of radio resource management (RRM) algorithms in the radio access network (RAN) such as control plane (CP) radio resource management (RRM) in the form of sizing/assignment of physical channel resources such as physical uplink control channel (PUCCH). However in some embodiments other radio resource management controls may be implemented. For example in some embodiments the physical channel assignment may be related to one or more of a physical uplink data channel, a physical downlink control channel, a physical downlink data channel and a random access channel.

Figure 1:
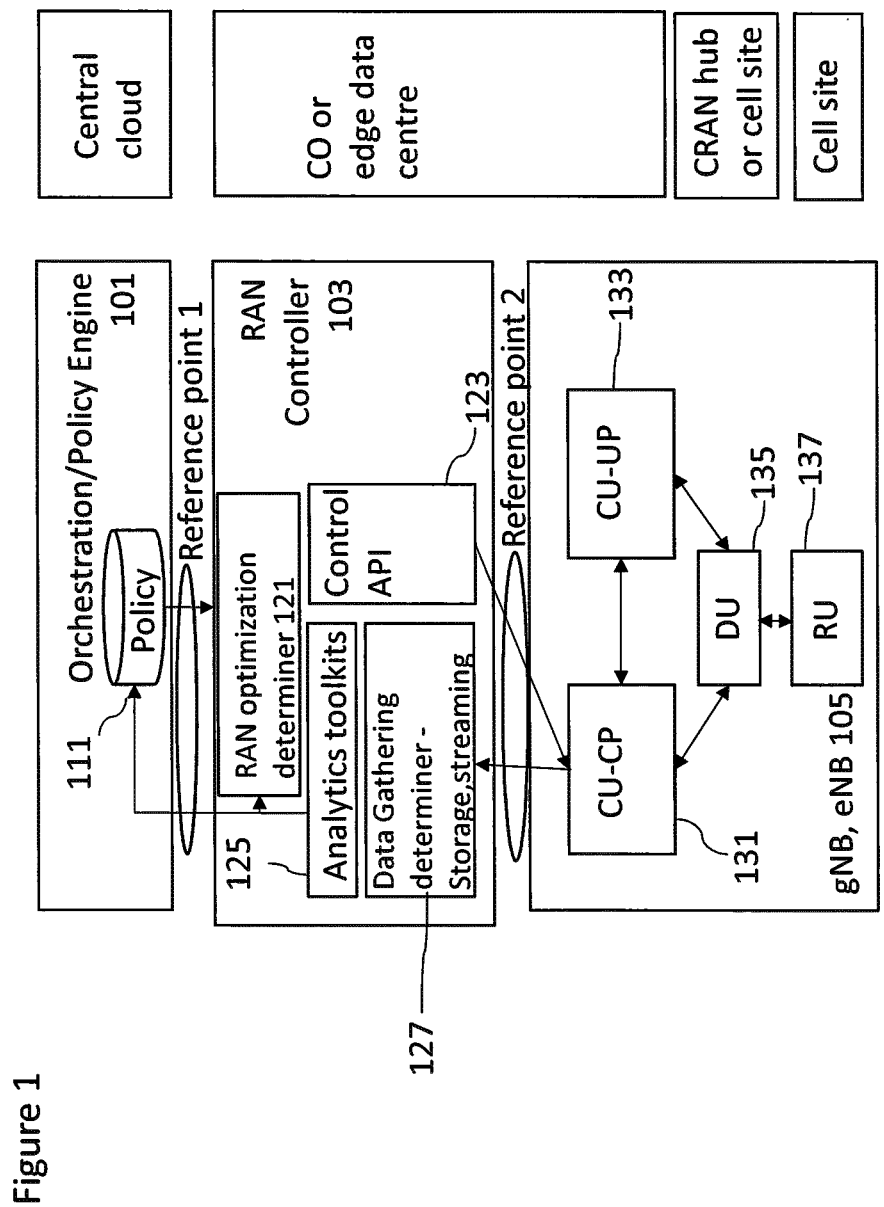
FIG. 1 shows a schematic diagram of an example architecture view of a communication system comprising a radio access network controller suitable for implementing some embodiments.

FIG. 1 for example shows a proposed architecture view and role of a proposed RAN controller and RAN element as described in further detail hereafter. In the following example the architecture comprises an Orchestration/Policy Engine 101 which typically operates at the central cloud layer, a RAN controller 103 which typically operates at a CO (Central Office) or edge data centre layer, and an access point 105 (such as a eNB, gNB or other access node) which may operate at the CO, a central radio access network (CRAN) hub or a cell site.

The Orchestration/Policy Engine 101, which operates at the central cloud layer can in some embodiments comprise policy directive functions 111. The policy directive functions 111 can provide policy directives to the RAN controller 103 and further receive feedback from the RAN controller 103 based on the applied policy directives over a reference point 1. The policy directives are configured to manage optimization in the RAN controller 103.

The RAN controller 103, may comprise a RAN optimisation determiner 121. These receive the policy directives as an input. The RAN controller 103 further comprises control APIs 123 for controlling the RAN access points (e.g. eNB, gNB, etc.) 105 over a reference point 2. The controller 103 further may comprise analytics toolkits 125 for analysing gathered data about the cells and outputting to the policy directive functions 111, the optimization determiner 121, and the control APIs 123. Also the controller 103 may comprise data gathering determiner 127 configured to acquire the data to be analysed from the RAN access point 105 over the reference point 2.

The access point 105, which in the following examples is a gNB but in some embodiments is any suitable radio access point, may be a single network element that encompasses all radio access network functions, or may support a cloud-based or decomposed architecture comprising for example a centralised unit for the control plane (CU-CP) 131, a centralised unit for the user plane (CU-UP) 133, a distributed unit (DU) 135 and a radio unit (RU) 137.

The CU-CP 131 is configured to receive the outputs from the control API 123 over the reference point 2 and furthermore report back to the data gathering determiner 127 over the same reference point 2. The centralised unit for the control plane (CU-CP) 131 is configured to control the control plane operations with respect to the access point and is configured to pass these control plane control operations to the distributed unit (DU) 135. The CU-CP 131 is further configured to communicate with the CU-UP 133.

The access point may also comprise a centralised unit for the user plane (CU-UP) 133 for controlling the user plane operations and passing this control to distributed unit (DU) 135. The CU-UP 133 may be configured to communicate with the CU-CP and the DU 137.

The distributed unit (DU) 135, typically located at the CRAN hub site or at the cell site, is configured to receive control plane and user plane information from the CU-CP 131 and CU-UP 133 respectively and furthermore control the radio unit (RU) 137.

The RU 137 is configured to configure the radio resources in communication with the user equipment (not shown in FIG. 1) within the cell.

In each cell, the RAN (eNB/gNB) has to decide the number of resources to be used for the physical uplink control channel (PUCCH) and other parameters such as the channel quality indication (CQI) reporting periodicity and scheduling request (SR) periodicity. Typically this is done once at cell initialization based on configuration parameters. The access point may be configured to apply an internal calculation on how many resources to use for the PUCCH based on configuration parameters for number of UEs (users), desired periodicity of channel quality indicator (CQI) reporting, etc. The determination of the number of resources to be used for the PUCCH (which may also be referred to as a PUCCH sizing algorithm or PUCCH decision logic) is typically done within the CU-CP. To achieve optimal performance with this decision logic in the RAN there are some key challenges, because the configuration parameters are typically set statically as template values for all cells.

However in practice, any individual cell may be very different from other cells. For example cells may differ significantly in terms of the number of users, the number of anticipated handovers, the UE speeds and mobility patterns. Furthermore each cell may also vary significantly with respect to these aspects over time. The approaches as discussed herein attempt to determine the number of resources assigned for PUCCH by the RAN.

As such in the embodiments discussed herein a method is described which features the definition of APIs from the RAN towards a RAN controller that may enable the RAN to expose a relevant data parameter set to the RAN controller. This may furthermore enable the RAN controller to learn the relevant characteristics of each cell, based on statistical analysis or machine learning applied to the data parameter set. From this determination of the relevant characteristics of each cell, the RAN controller may then be configured to communicate with the RAN to make (optimal) adjustments to the PUCCH sizing. This communication may be performed by a further supported API from the RAN controller towards the RAN.

In some embodiments the RAN controller may be configured to adjust the (optimal) desired size of the PUCCH as the conditions in the cell change.

In some embodiments, the API and the controller are furthermore configured to be applicable to both LTE eNB as well as 5G gNB and for both bare-metal eNB/gNB as well as cloud-based/decomposed architectures for eNB/gNB.

Figure 2:
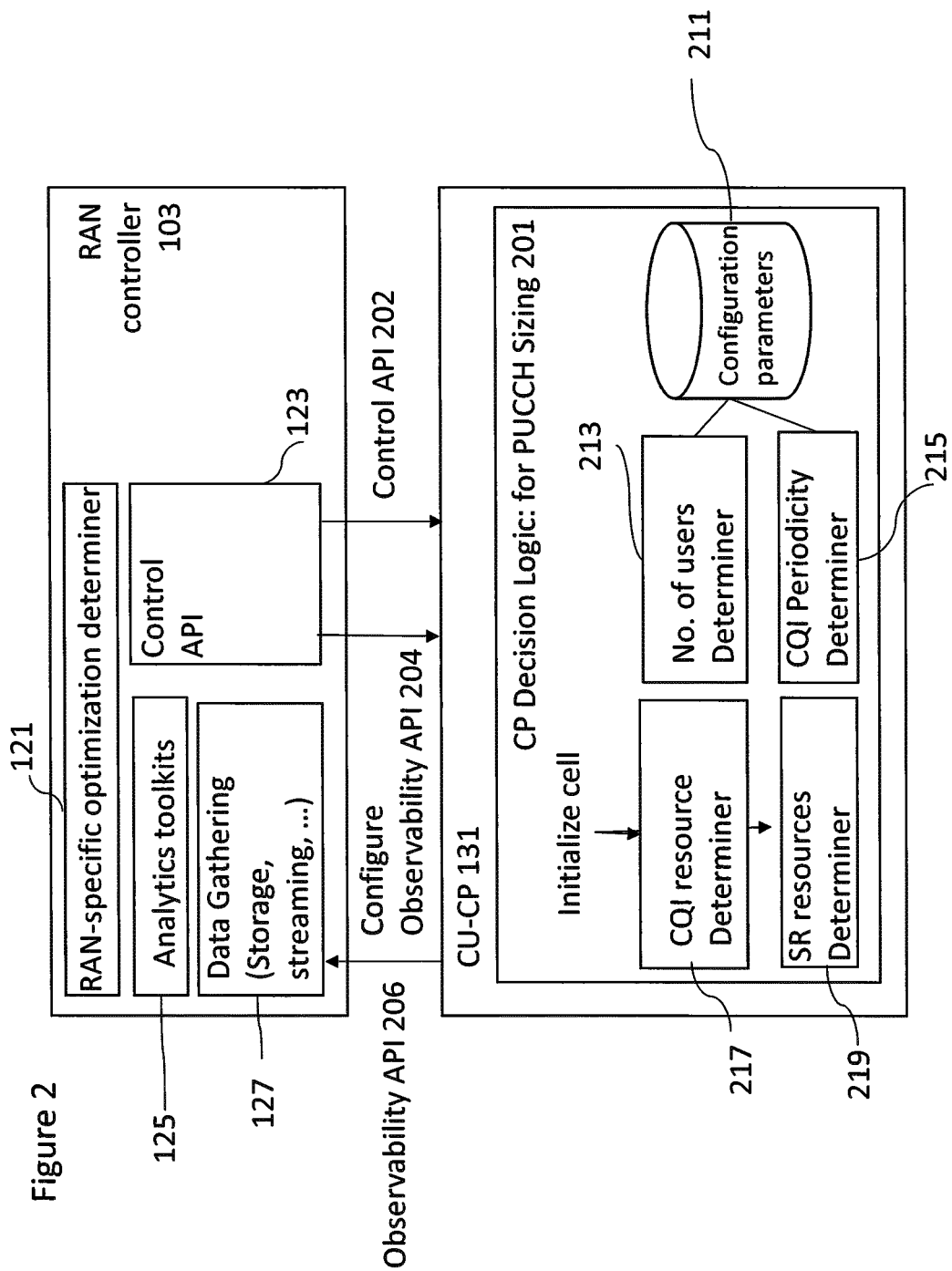
FIG. 2 shows a schematic diagram of an example architecture view and set of application programming interfaces configured to control a physical uplink control channel sizing in the radio access network.

With respect to FIG. 2 example APIs enabling the control of the CU-CP for configuring (and furthermore for analytics) according to some embodiments are shown in further detail. The RAN controller 103, may comprise one or more RAN optimisation algorithms 121, control APIs 123 analytics toolkits 125 and data gathering 127 as discussed in FIG. 1.

Furthermore FIG. 2 shows the CU-CP 131 which comprises CP decision logic for PUCCH sizing 201. The CP decision logic for PUCCH sizing 201 comprises configuration parameters 211. These configuration parameters are typically set by an element management system (EMS) based on templates that provide worst-case values that are not reflective of the actual conditions prevailing in each cell. The configuration parameters may be passed to a series of determiners of which a number of users determiner 213 and a channel quality indicator (CQI) periodicity determiner 215 are shown. The parameter determiners may be used as inputs to control parameter determiners. In the absence of the present invention, these may merely use the configuration parameters without any further calculation. However, their behaviour may be enhanced with the present invention FIG. 2 shows example control parameter determiners such as the CQI resource determiner 217 and a SR (scheduling requests) resource determiner 219. The control parameter determiners may furthermore accept as an input a initialize cell input, in other words the control parameter determiners are configured to generate control parameters at least when the cell is initialized.

FIG. 2 furthermore shows the programmable APIs which communicate parameters between the RAN controller 103 and the CU-CP 131 in the form of an observability API 206 from the CU-CP 131 to the RAN controller 103. Also is shown a configure observability API 204 from the RAN controller 103 to the CU-CP 131 and furthermore a control API 202 from the RAN controller 103 to the CU-CP 131.

Figure 3:
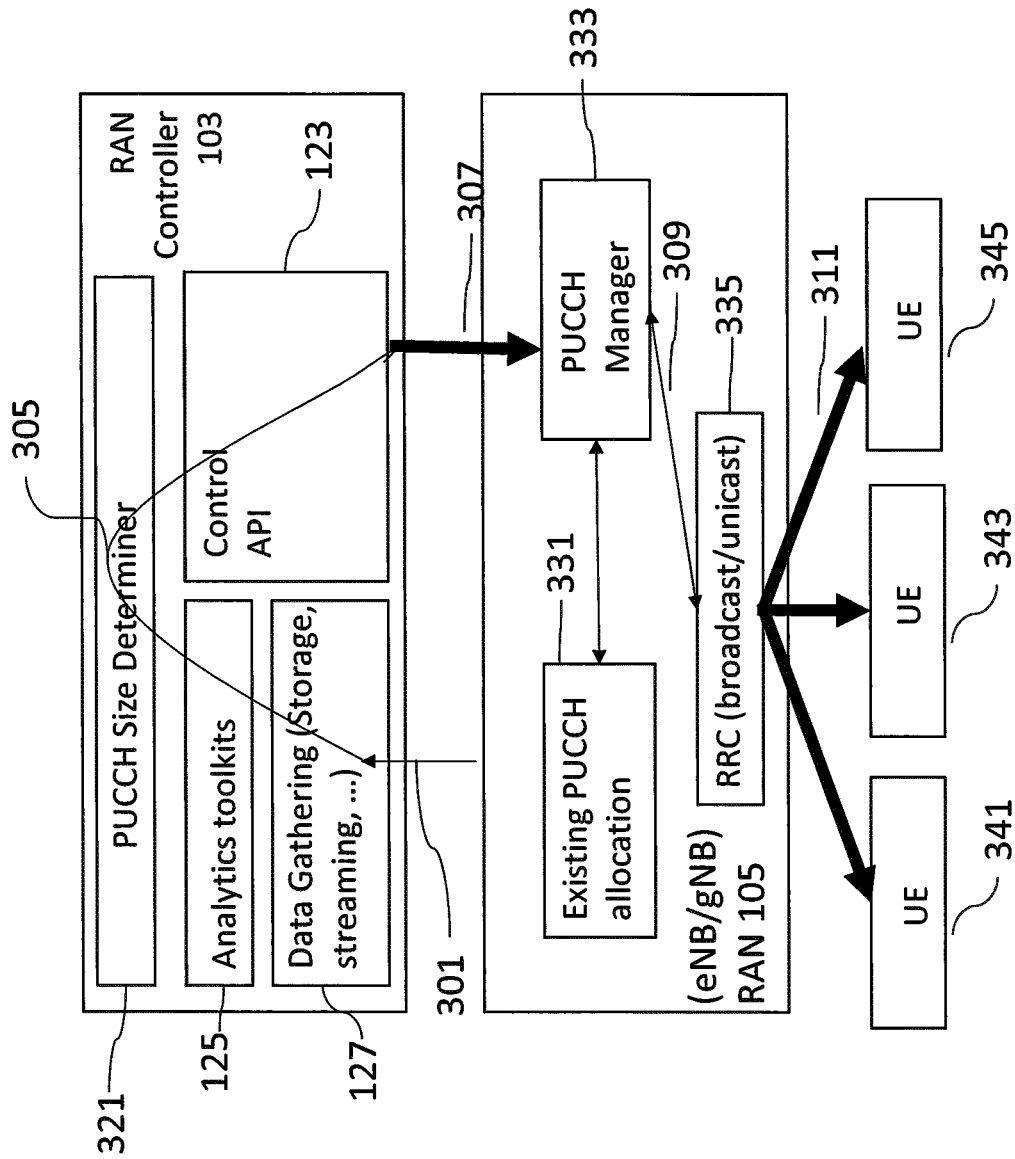
FIG. 3 shows a schematic diagram of an example control flow between a access point, controller and user equipment summarising the operations of the application programming interfaces configured to control a physical uplink control channel sizing in the radio access network according to some embodiments.

With respect to FIG. 3 is shown a summary of the API control concept and the RAN implementation of the control according to some embodiments. The system shown in FIG. 3 comprises the RAN controller 103, comprising PUCCH size optimisation determiner 321 (as a component of the RAN-specific optimization determiner shown in FIGS. 1 and 2), control APIs 123 for controlling the RAN access points 105 over the reference point 2, analytics toolkits 125 and data gathering determiner 127.

The access point or Radio Access Network access point (RAN) 105, for example a eNB or gNB may comprise as shown in FIG. 1, a centralised unit for the control plane (CU-CP), a centralised unit for the user plane (CU-CP), a distributed unit and a radio unit (RU) however with respect to the embodiments described herein the RAN 105 is shown comprising a PUCCH manager 333, an existing PUCCH allocation 331 and a radio resource controller (RRC) 335 suitable for unicast or broadcast to UEs 341, 343, 345 within the RAN access point cell boundary.

Although not directly associated with the proposed method of implementing controls for optimizing the PUCCH sizing in an eNB/gNB there may be prior to the implementation of the updating/modification of the PUCCH sizing a series of operations which may be summarised as:

operation a) (as shown in FIG. 3 by arrow 301) which comprises providing (by an eNB/gNB/RAN 105 to the RAN controller 103) a set of data/attributes related to facilitating PUCCH sizing optimization. The set of data/attributes may comprise: For one or more (or all) UEs, provide information on the UE speed and channel variation, these are described in further detail hereafter; For one or more (or all) UEs that connect or come into the cell by handover, provide the allocated PUCCH resource(s), this is described in further detail hereafter; For one or more (or all) UEs, provide information when new uplink data indication is received, this is described in further detail hereafter; Indication of current number of RRC connected UEs in the cell; decoding error rates or measures of interference on the PUCCH; and DL and UL throughput of the users in the cell;

operation b) (as shown in FIG. 3 by arrow 305) which comprises making (by the RAN controller) a determination on modifications/update to the PUCCH size or other attributes such as the CQI reporting period or the SR period based on the data/attributes.

These operations may be seen from the viewpoint of the RAN controller 103 as controller 103 implemented aspects.

Having determined a modification/update to the PUCCH a series of operations of implementing these modifications/updates from the viewpoint of the RAN access point and the user equipment is explored hereafter.

A first operation which comprises receiving (by the RAN access point) a notification (from a RAN controller). The notification indicating a desired change in the PUCCH size including additional indicators indicating the manner in which the RAN should adapt its PUCCH allocations to UEs. In other words a first interface is supported between the RAN controller 103 and the RAN access point 105 as shown in FIG. 3 by the arrow 307 from the RAN controller 103 and the RAN access point 105. Over this interface may be provided the notification indicating a change for the physical channel resource allocation or allocations.

In some embodiments the notification is received from controller indicating a desired change in the PUCCH size (for example an updated PUCCH size and parameters) comprises additional indications regarding how the RAN access point is configured to adapt the RAN access point PUCCH allocations to UEs. These additional indications or information may comprise an indication (or information) indicating a manner in which the RAN access point should allocate PUCCH resources, this may for example be at least one of:

(i) a "minimize number of consumed PRBs" allocation method, (ii) a "equally load all allowed PUCCH PRBs" allocation method, (iii) a "minimize fragmentation" allocation method.

It would be understood that some combinations of these allocation methods may be indicated. For example allocation methods which are a "minimize number of consumed PRBs" (i)+"minimize fragmentation" (iii) combination of or an "equally load all allowed PUCCH PRBs" (ii)+"minimize fragmentation" (iii) combination.

These additional indications or information, in some embodiments, may comprise an indication or information indicating that among the PRBs currently available for PUCCH, certain PRBs should not be used for PUCCH assignment (in other words that there are reserved PRBs) and other PRBs can be used for PUCCH assignment, and no explicit indication of a change in PUCCH parameters should be broadcast to the UEs Furthermore in some embodiments the additional indication or information may comprise an indication indicating whether the change should be applied immediately, or gradually (for example in some embodiments the indication may provide information to implement the change after a specified delay).

The above notification and indications may be implemented in any suitable manner. For example if the notification from the controller contains an indication that among the PRBs currently available for PUCCH, certain PRBs should no longer be used for PUCCH assignment, this can be indicated by a single bit. In addition, the controller may provide a bitmap indicating one or more specific PRBs which should no longer be used for PUCCH assignment. For example if there are N currently available PRBs for PUCCH, a N-length bitmap is provided, where a first value (for example '0') at position K indicates PRB K should no longer be used, and a second value (for example '1') indicates that PRB K is available to be assigned. In some embodiments where the newly-disallowed PRBs already have existing PUCCH allocations to some UEs and where the notification comprised an indicator which indicates that the change should be applied immediately, then the RAN access point (manager) can be configured to immediately find a new allocation for those UEs on the still-allowed PRBs, and send RRC reconfigurations to the reassigned UEs. However where the indicator indicates that the change should be applied gradually or after a delay, the RAN access point (manager) can be configured to stop assigning any new UEs to those PRBs and wait for those existing UEs on those PRBs to release their connections. In some embodiments where some UEs have still not released the connections after the specified delay, the RAN access point or manager can be configured to force reassignment of those UEs.

In some embodiments this can be used in particular to effect a decrease in the available PUCCH region, without having to update the broadcast information (SIB) to indicate a change in the PUCCH parameters. Thus the RAN access point is configured to stop using certain PRBs for PUCCH assignments, and will be free to use those PRBs for physical uplink shared channel (PUSCH) or other allocations.

In some embodiments the notification can indicate an increase of the number of available PUCCH PRBs by a change in the bitmap to indicate that certain previously-disallowed PRBs are now allowed for PUCCH. In these situations the RAN access point (manager) may be configured to make those PRBs indicated available for PUCCH assignments (in a manner consistent with the other indications from the controller for example the "minimize fragmentation" allocation method etc.). In such embodiments once some PUCCH assignments has been made on a certain PRB, the RAN can stop using those PRBs for PUSCH assignments.

In some embodiments some indications regarding how RAN should adapt its PUCCH allocations in the notification from the controller can be encoded as a bitmap, with one bit for each possible indication. For example if the allowed indications are (i) "minimize number of consumed PRBs", (ii) "equalize load on PRBs" and (iii) "minimize fragmentation", this can be represented as a 3-bit bitmap, with first bit value of 1 representing that "minimize number of consumed PRBs" is desired, etc. In such implementations there may be allowed some combinations of indications. For example 101 would indicate "minimize number of consumed PRBs" as well as "minimize fragmentation". However in some embodiments some combinations of these may not be allowed. For example a combination of 11* may not be allowed, as "minimize number of consumed PRBs" may be a contradictory objective to "equalize load"

A second operation (as shown in FIG. 3 by arrow 309) which comprises taking actions (for example by the PUCCH manager 333 functional entity within the RAN access point 105) to update/modify its PUCCH allocations for existing and new UEs 341, 343, 345 to utilize the indicated manner of allocating PUCCH resources.

The PUCCH manager 333 may thus be configured to receive the notification indicating a desired change in the PUCCH size and which may also include the additional indicators indicating the manner in which the RAN should adapt its PUCCH allocations to UEs and implement these changes in the manner indicated. In some embodiments this may involve determining current or existing PUCCH allocation information 331 and then controlling a radio resource controller to signal or indicate this change to the UEs.

Thus for example in some embodiments the PUCCH manager 333 is configured such that when the indication of the manner in which the RAN should allocate PUCCH resources is one of a (i) "minimize number of consumed PRBs" allocation method that for any subsequent PUCCH allocations to assign a PUCCH resource on the PRB with the highest number of already allocated resources. In this respect "Consumed" means "at least one PUCCH resource on that PRB has been assigned to at least one UE".

In some embodiments an equivalent alternative to this indication would be to receive an indication indicating a "maximal filling" allocation. In this case the RAN access point (and the PUCCH manager 333) may be configured to assign PUCCH resources on the PRB with the highest number of already allocated resources.

In some embodiments the PUCCH manager 333 is configured such that when the indication of the manner in which the RAN should allocate PUCCH resources is one of a (ii) "equally load all allowed PUCCH PRBs" allocation method, then for any subsequent PUCCH allocations, the manager is configured to assign PUCCH resources so as to equalize the number of resources assigned on PUCCH PRBs. This may be achieved for example by allocating to a UE a resource on the PRB(s) with the lowest number of resources allocated so far. In some further embodiments an equivalent alternative to this indication is an indication indicating the PUCCH manager 333 to perform a "minimize worst-case intra-cell PUCCH interference" allocation method. In this case the RAN access point (the PUCCH manager 333) may be configured to assign PUCCH resources so as to equalize the number of resources assigned on PUCCH PRBs.

Furthermore in some embodiments the PUCCH manager 333 is configured such that when the indication of the manner in which the RAN should allocate PUCCH resources is one of a (iii) "minimize fragmentation" allocation method, the manager 333 is configured for any subsequent PUCCH allocations, if there is a choice of more than one PUCCH PRBs on which allocation could be implemented to choose a resource on a PUCCH PRB which is contiguous with PUCCH PRBs that already have one or more resources allocated.

Additionally the PUCCH manager 333 in some embodiments may be configured such that when the indication of the manner in which the RAN should allocate PUCCH resources is one of a (iv) "minimize RRC reconfigurations" allocation method the RAN access point or manager 333 is configured to decide to postpone reassignment of UEs with PUCCH resources on certain PRBs if multiple reassignments would be needed in order to free up a PRB, or decide to reassign some UEs if just a small number of reassignments would be sufficient to free up the PRB.

Where multiple indications among the above are provided the manager may be configured to implement the PUCCH allocation taking all of the indicated allocation methods into account.

In some embodiments the PUCCH manager 333 is configured such that when the controller further indicates that among the PRBs currently available for PUCCH, certain PRBs should not be used for PUCCH assignment and other PRBs can be used for PUCCH assignment (in other words reserving some RRBs from allocation) then the manager may be configured to stop any further PUCCH assignments on the PRBs which the controller has indicated should not be used for PUCCH assignment. Furthermore in some embodiments if the controller has indicated that the change should be applied immediately then the manager may be configured to determine if there are any existing UEs with assignments on the PRBs which controller has indicated should not be used for PUCCH, reassigning the PUCCH resources for those UEs to fit within the PRBs that the controller has indicated can be used for PUCCH. Also in some embodiments once the PRBs which controller has indicated should not be used for PUCCH assignment are free of PUCCH assignments then the RAN access point (or the manager 333) may be configured to use these PRBs for other assignments, for example PUSCH assignments.

The above operation of taking actions (for example by the PUCCH manager 333 functional entity within the RAN access point 105) to update/modify PUCCH allocations for existing and new UEs 341, 343, 345 to utilize the indicated manner of allocating PUCCH may be implemented in any suitable manner.

For example in some embodiments based on the indication provided in the controller's notification, the PUCCH manager 333 functional entity in the RAN can be configured to update its decision logic for determining PUCCH allocations for existing and/or new UEs as follows:

If the indicated manner is "maximal packing/minimize number of consumed PUCCH PRBs" then for any subsequent PUCCH allocations, assigning a PUCCH resource on the PRB with the highest number of already allocated resources, as long as the number of already allocated resources on that PRB is less than the maximum allowed number. An example of this may be a situation where the updated PUCCH configuration notified by the controller is that there will be 4 available PRBs for PUCCH, and a maximum of 6 UEs can be allocated resources for PUCCH on a given PRB. Furthermore the example may be extended such that there are UEs with currently allocated resources on the 4 PRBs of 6, 5, 3, 0 respectively. In other words 3 of the 4 PRBs have been "consumed". If a new UE connection request is received, the RAN can in such an example be configured to assign a resource from the second PRB.

The logic for such an operation may be for example a RAN cannot allocate on the first PRB since that has already reached the maximum allocation. It should not assign on the last PRB, as that would increase the number of consumed PRBs. The choice is between the second and third PRBs. Allocating on the third PRB (compared to the second PRB) will result in a higher expected number of consumed PRBs in the long run. For example allocating a new UE on the third PRB would result in 4 UEs on the third PRB, and would require at least 4 UE departures before the third PRB is "freed up", whereas allocating the new UE to the second PRB, only 3 UE departures may be required for the third PRB to be freed up.

So to minimize the number of consumed resources in this example, the new UE should be assigned a resource on the second PRB.

In some embodiments this allocation method implementation may further be modified to take into account the indication from the controller to "minimize RRC reconfigurations" or "equally load PRBs" or other allocation indication within the notification.

In some embodiments the manager function 333 is configured to reassign or apply other manager functions, without waiting for a new UE connection request. For example in some embodiments the manager function 333 is configured to try to reassign one of the existing UEs from the third PRB onto the second PRB. Thus reassignment may therefore change the number of assigned UEs on the various PRBs from (6,5,3,0) to (6,6,2,0). Thus reassignment may have the effect of increasing the likelihood that the third PRB will be freed up more quickly, resulting in a lower expected number of consumed PRBs in the long run for the same reasons as suggested above. Thus in some embodiments the RAN and the manager function 333 may be configured to take "immediate reassignment" decisions for some existing UEs.

In some embodiments where the indicated assignment method is an "equally load all allowed PUCCH PRBs", the RAN (and manager function 333) is configured to attempt to make assignments which will try to assign PUCCH resources so as to equalize the number of resources assigned on the available PUCCH PRBs. In some embodiments this may be performed by allocating a resource on the PRB(s) with current lowest number of resources allocated among the available PUCCH PRBs.

Thus with a system with the above example allocations where there are 4 available PUCCH PRBs, and the number of UEs with currently allocated resources on the 4 PRBs is 6, 5, 3, 0 respectively and which may be defined by (6,5,3,0). If a new UE connection request is received, the RAN (manager function 333) may be configured to assign a resource from the fourth PRB as this will bring the allocation closer to equalizing the load on the different PUCCH PRBs.

As discussed above in some embodiments the RAN or manager function 333 may be configured to attempt to reassign one or more existing UEs to achieve a more equalized assignment without waiting for a new UE connection request. For example, the RAN may try to reassign a UE from the first PRB (the one which is highest loaded) to the fourth PRB (which is currently the lowest loaded).

In some embodiments the same strategy may be followed where the indicated allocation method is a "minimize worst-case intra-cell PUCCH interference" method.

In some embodiments where the indicated assignment method is a "minimize fragmentation" allocation method, the RAN or manager function 333 may be configured to assign UEs as much as possible to contiguous PRBs within the available PRBs for PUCCH. As discussed above in some embodiments this allocation method may be indicated in combination with one of the above indications. For example minimize fragmentation may be received in combination with a "minimize number of consumed PRBs" indication. In such embodiments the manager function 333 may be configured to attempt take all of those into account. In some embodiments there may be combinations which may be contradictory and may require detecting and special handling thereof.

In some embodiments the manager function 333 may be configured to determine that for any new connecting UEs, a "minimize fragmentation" allocation method is processed so that if there is a choice of more than one PUCCH PRBs on which allocation could be done, a resource on a PUCCH PRB which is contiguous with PUCCH PRBs that already have one or more resources allocated is chosen. Where there is more than one such PUCCH PRB, then the manager function 333 may be configured to choose one that results in the longest block of free PRBs (in other words a PUCCH PRBs with no UE assigned)

For example suppose there are 6 PUCCH PRBs, and the number of UE allocations on those are (3,0,0,0,2,0), the maximum allowed number of UEs assigned to a PRB is 4, and a new UE connection request is received. In such a situation if the indication from the controller is "minimize fragmentation" in combination with "minimize number of consumed PRBs" the RAN or manager function 333 is configured to assign the new UE to PRB number 1. Similarly if the indication from the controller is "minimize fragmentation" in combination with "equalize load" then the RAN or manager function 333 is configured to assign the new UE to PRB number 6 (or in some embodiments assigning the UE to PRB 5 may also be allowed as well).

As discussed earlier in addition to adapting a policy for PUCCH assignments as above for new UEs, the RAN or manager function 333 may also be configured to allocate PRBs where there are no new UEs. For example to allocate any PRBs that have not been assigned to any UE for PUSCH use.

In some embodiments the manager function 333 is configured to also assign a PRB selectively for PUSCH in any given TTI, if no UE is expected to use the PUCCH (for example to report CQI) on that PRB in that TTI. However, if the PUSCH transmission encounters a HARQ error, the UE may synchronously retransmit on the same PRB 8 TTIs later, and there may be a PUCCH transmission expected in that subsequent slot. In this case, the RAN should ensure that it takes appropriate action to avoid the retransmission if there is an expected PUCCH transmission. This may be implemented in some embodiments by providing a 'fake ack' on PUCCH and later giving an explicit retransmission grant.

Figure 5:
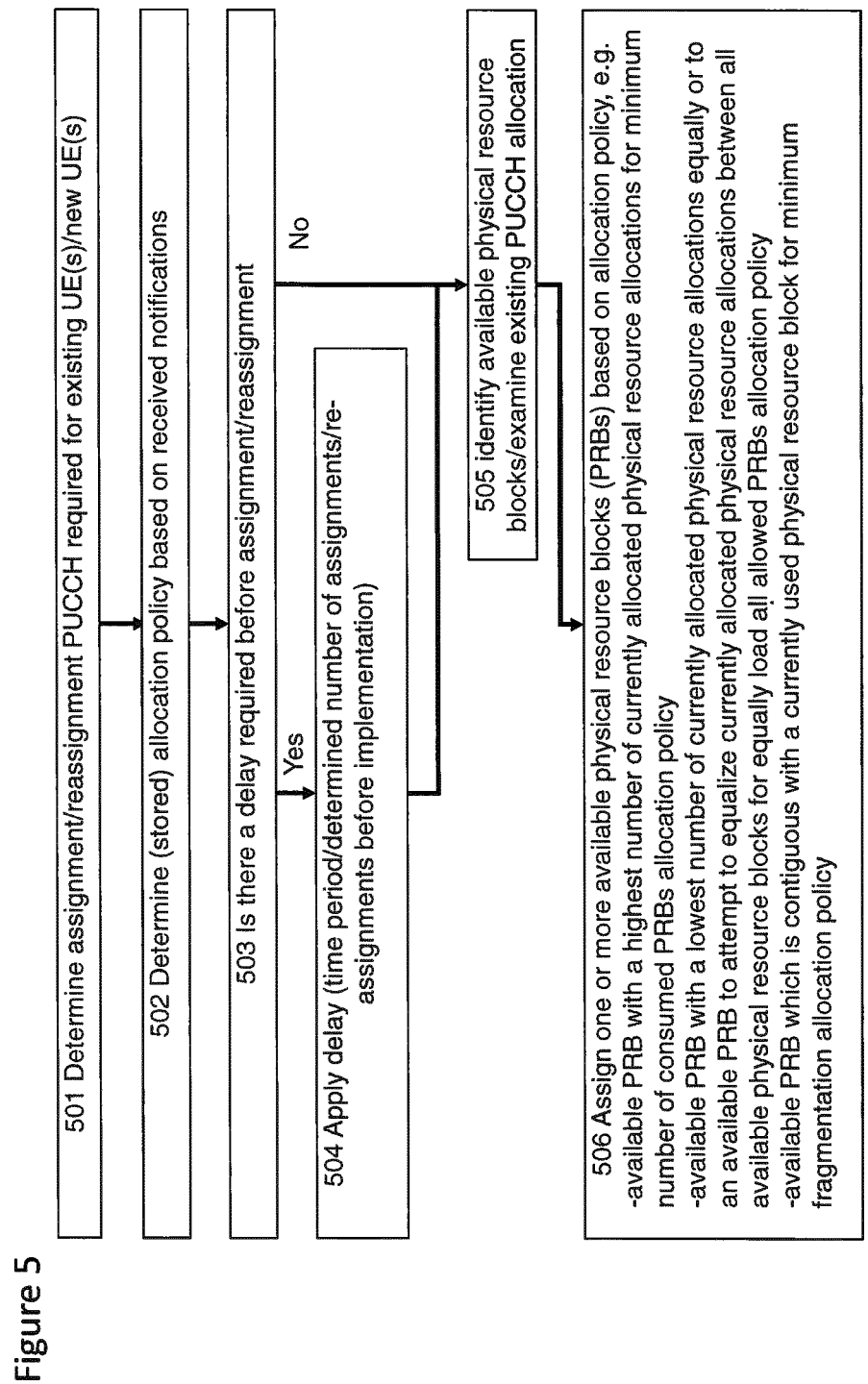
FIG. 5 shows a flowchart of an example method for implementing assignment/reassignment of physical uplink control channel allocations according to some embodiments.

An example flow diagram showing the operations of the manager function according to some embodiments is shown in FIG. 5.

The first operation of which is the manager function 333 caused to determine an assignment/reassignment for a PUCCH resource is required. For example based on an existing UE(s) and/or new UE(s) resource request. The operation of determining an assignment/reassignment for a PUCCH resource is required is shown in FIG. 5 by step 501.

The next operation is the determination, for example the recovery of a stored copy or received notification based on a request or otherwise allocation policy as shown in FIG. 5 by step 502.

The next operation is the determination of whether a delay is required or requested based on the allocation policy as set by the earlier notifications as shown in FIG. 5 by step 503.

Where a delay is required then the delay is applied. For example the delay may be a time delay of a determined period, or the delay may be a delay implemented until a determined number of assignments/re-assignments are to be implemented. The application of the delay is shown in FIG. 5 by step 504.

Where no delay is required or the delay is implemented then the manager function is then required to identify available physical resources and the blocks. The available resources may be determined by examining the stored existing PUCCH allocation. The determination of the available physical resources is shown in FIG. 5 by step 505.

Having determined the available resource then the manager may assign one or more available physical resource blocks (PRBs) based on allocation policy. Thus for example assign one or more of the available PRB with a highest number of currently allocated physical resource allocations for minimum number of consumed PRBs allocation policy, or assign one or more of the available PRB with a lowest number of currently allocated physical resource allocations equally or to an available PRB to attempt to equalize currently allocated physical resource allocations between all available physical resource blocks for equally load all allowed PRBs allocation policy or assign one or more of the available PRB which is contiguous with a currently used physical resource block for minimum fragmentation allocation policy. This assigning operation is shown in FIG. 5 by step 506.

A third operation comprises sending notification (by the RAN access point 105) to UEs 341, 343, 345 of the change to the PUCCH, taking into account the indication of whether the change should be applied immediately or gradually and/or after a delay. In some embodiments the RRC 335 is configured or caused to notify any UEs within the cell of the intended change of PUCCH by sending system information broadcast messages announcing the new PUCCH parameters. For example by broadcasting a paging message notifying UEs to read the updated system information broadcast messages.

In other words a further interface is supported between the RAN access point 105 and at least one user equipment 341, 343, 345 as shown in FIG. 3 by arrow 311 from the RAN access point 105 to the user equipment 341, 343, 345. Over this interface may be provided the information for implementing from the user equipment point of view a change for the physical channel resource allocation or allocations.

In some embodiments where the PUCCH change is indicated to be applied immediately the RRC 335 may be configured to determine, for one or more existing UEs, an updated PUCCH resource allocation as per the updated PUCCH allocation policy. The RRC 335 may then be configured to notify those UEs using a unicast/dedicated RRC reconfiguration message providing the updated PUCCH resource allocation.

In some embodiments where the PUCCH change is indicated to be applied gradually then the RRC 335 can be configured such that it does not implement one or more of the above steps immediately, or implements them after a specified delay.

The operation of sending notification to UEs of the change to the PUCCH, taking into account the indication may be implemented according to any suitable manner.

For example in some embodiments the RRC 335 or other output channel is configured to send system information broadcast messages announcing the new PUCCH parameters. Additionally in some embodiments the RRC 335 is configured to broadcast a paging message notifying any UEs within the cell to read the updated system information broadcast messages.

In some embodiments where the PUCCH change is indicated to be applied immediately then an updated PUCCH resource allocation as per the updated PUCCH allocation policy may be determined for one or more existing UEs (this as noted in the assignment implementations above) and the RAN may decide to reassign UEs with not new added or removed UEs. In some embodiments the operation of notifying those UEs where there are reassignments can be performed by use of a unicast/dedicated RRC reconfiguration message providing the updated PUCCH resource allocation.

In some embodiments where the PUCCH change is indicated to be applied gradually then the broadcast messages may be delayed by a specified delay before being implemented.

Figure 4:
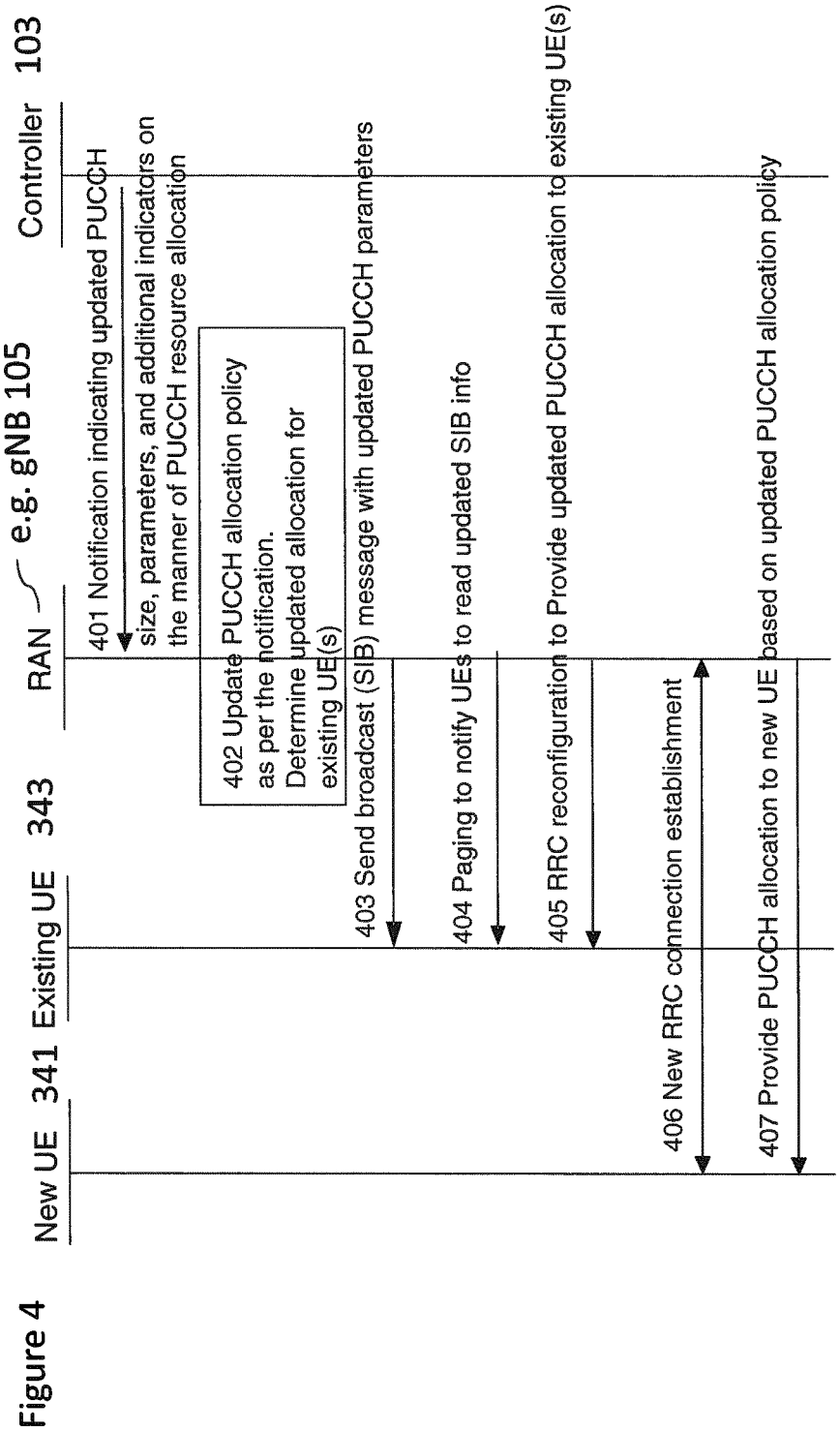
FIG. 4 shows a flowchart of an example method for supporting control flow between the access point, controller and user equipment shown in FIG. 3 according to some embodiments.

With respect to FIG. 4 is shown an example message flow which shows the interactions as shown in FIG. 3 according to some embodiments.

The (RAN) controller 103 may be configured to generate and transmit a notification indicating updated PUCCH size, parameters, and additional indicators on the manner of PUCCH resource allocation to the RAN access point 105, such as the gNB, as shown in FIG. 4 by step 401.

The RAN access point 105 may then be configured to Update PUCCH allocation policy as per the notification and thus determine updated allocation for existing UE(s) as shown in FIG. 4 by step 402.

The RAN access point 105 may, in some embodiments, be configured for existing user equipment, for example UE 343, to send broadcast (SIB) message with updated PUCCH parameters as shown in FIG. 4 by step 403.

Furthermore the RAN access point 105 may, in some embodiments, be configured for existing user equipment, for example UE 343, to send paging to notify UEs to read updated SIB information as shown in FIG. 4 by step 404.

Also the RAN access point 105 may, in some embodiments, be configured for existing user equipment, for example UE 343, send RRC reconfiguration messages to provide updated PUCCH allocation to existing UE(s) as shown in FIG. 4 by step 405.

The RAN access point 105 may, in some embodiments, be configured for new user equipment, for example UE 342, to receive new RRC connection establishment requests as shown in FIG. 4 by step 406.

For these new user equipment, the RAN access point 105 may be configured to provide PUCCH allocation to new UEs based on the updated PUCCH allocation policy as shown in FIG. 4 by step 407.

Although example message flows are shown for existing and new UEs in FIG. 4 in some embodiments where the notification from the controller in step 401 contains an indication that among the PRBs currently available for PUCCH, certain PRBs should no longer be used for PUCCH assignment, but no explicit indication of a change in PUCCH parameters should be broadcast to the UEs then steps 403, and 404 are not implemented (or in other words not needed).

Furthermore in some embodiments where the notification from the controller in step 401 contains an indication that the change should be applied immediately then steps 403, and 404 may be executed immediately.

Also in some embodiments where the RAN access point is configured to determine updated PUCCH assignments for one or more existing UEs, the RAN access point may be configured to implement step 5 for providing updated assignments to those UEs with a RRC reconfiguration message.

In some embodiments where the notification from the controller in step 401 contains an indication that the change should be applied after a specified delay then steps 402 onwards may be implemented after the delay is implemented.

Figure 6:
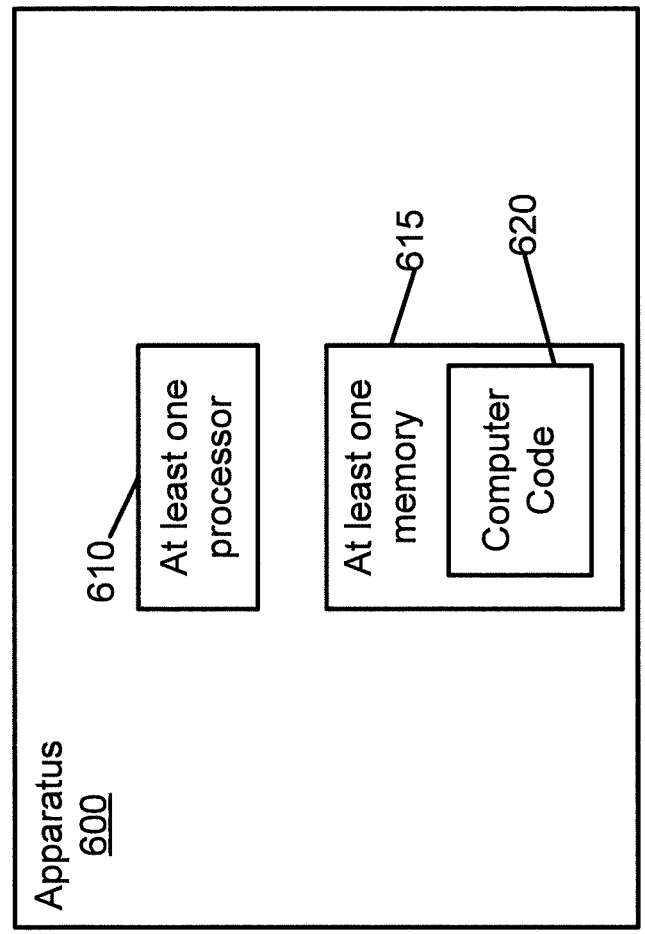
FIG. 6 shows an apparatus.

Referring to FIG. 6, an apparatus 600 is shown. The apparatus 600 comprises at least one processor 610 and at least one memory 615. The at least one memory comprise computer code 620.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of an unlicensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions.

The invention claimed is:

1. An apparatus comprising:
at least one processor; and
at least one memory storing instructions that, when executed by the at least one processor, cause the apparatus at least to perform:
receiving, at the apparatus that implements at least part of a radio access network node, at least one notification from at least one radio access network node controller, the at least one notification caused to notify the apparatus of at least one physical uplink control channel assignment policy indication indicating at least a change in one or more attributes for at least one physical uplink control channel resource;
implementing, by the apparatus for at least one user equipment associated with the apparatus, the change in the one or more attributes for the at least one physical uplink control channel resource at least by implementing at least one physical uplink control channel assignment to an available physical resource block based on the at least one physical uplink control channel assignment policy indication,
  wherein the at least one physical uplink control channel assignment policy indication indicating at least the change in the one or more attributes for at least one physical uplink control channel resource indicates a change in size of the at least one physical uplink control channel resource, and, in response to the change in the size, the change in the one or more attributes for the at least one physical uplink control channel resource is implemented by implementing at least one physical uplink control channel assignment to an available physical resource block to resize the at least one physical uplink control channel resource; and
  generating and transmitting at least one assignment notification to the at least one user equipment associated with the apparatus, the at least one assignment notification caused to notify the at least one user equipment of the at least one physical uplink control channel assignment.

2. The apparatus as claimed in claim 1, wherein the at least one notification further comprises an indicator conveying to the apparatus an urgency factor for the at least one physical uplink control channel assignment.

3. The apparatus as claimed in claim 2, wherein the indicator conveying to the apparatus an urgency factor for the at least one physical uplink control channel assignment comprises one of:
  an indicator for indicating an assignment for the at least one physical uplink control channel resource for the at least one user equipment is to be performed immediately; or
  an indicator for indicating an assignment for the at least one physical uplink control channel resource for the at least one user equipment is to be performed after a determined time.

4. The apparatus as claimed in claim 1, wherein the implementing at least one physical uplink control channel assignment based on the at least one physical uplink control channel assignment policy indication implements at least one of:
  assign, reassign, or both assign and reassign the at least one physical uplink control channel resource to the available physical resource block with a highest number of currently allocated physical resource allocations;
  assign, reassign, or both assign and reassign the at least one physical uplink control channel resource to the available physical resource block with a lowest number of currently allocated physical resource allocations;
  assign, reassign, or both assign and reassign the at least one physical uplink control channel resource to the available physical resource block to attempt to equalize currently allocated physical resource allocations between all available physical resource blocks;
  assign, reassign, or both assign and reassign the at least one physical uplink control channel resource to the available physical resource block which is contiguous with a currently used physical resource block; or
  assign, reassign, or both assign and reassign the at least one physical uplink control channel resource to the available physical resource block after a determined number of assignments or a determined number of reassignments or both a determined number of assignments and a determined number of reassignments are detected.

5. The apparatus as claimed in claim 1, wherein the generating and transmitting is configured to:
  generate and broadcast a system information broadcast message, the system information broadcast message comprising information associated with the at least one physical uplink control channel assignment; and
  generate and broadcast a paging message, the paging message caused to notify the at least one user equipment of the system information broadcast message.

6. The apparatus as claimed in claim 1, wherein the generating and transmitting is configured to:
  generate and unicast a radio resource control message to the at least one user equipment, the radio resource control message comprising information associated with the at least one physical uplink control channel assignment.

7. The apparatus as claimed in claim 1, wherein the at least one memory further stores instructions that, when executed by the at least one processor, causes apparatus at least to perform providing, from the apparatus to the at least one radio access network node controller, a set of data and attributes related to facilitating at least sizing of the at least one physical uplink control channel resource, and wherein the receiving the at least one notification is in response to the providing the set of data and attributes.

8. The apparatus as claimed in claim 1, wherein the at least one notification comprises an indicator conveying to the apparatus the at least one physical uplink control channel assignment policy indication, the indicator conveying to the apparatus the at least one physical uplink control channel assignment policy indication comprises at least one of:
  an indicator for minimizing a number of consumed physical resource blocks for the at least one physical uplink control channel assignment;
  an indicator for maximal filling of consumed physical resource blocks for the at least one physical uplink control channel assignment;
  an indicator for equally loading consumed physical resource blocks for the at least one physical uplink control channel assignment;
  an indicator for minimizing worst-case intra-cell interference for consumed physical resource blocks for the at least one physical uplink control channel assignment;
  an indicator for minimizing fragmentation of consumed physical resource blocks for the at least one physical uplink control channel assignment;
  an indicator for minimize radio resource uplink control reconfigurations for the at least one physical uplink control channel assignment;
  an indicator indicating that at least a first physical resource block is not allowed to be used for the at least one physical uplink control channel assignment; or
  an indicator indicating that at least a second physical resource block is allowed to be used for the at least one physical uplink control channel assignment.

9. The apparatus as claimed in claim 1, wherein the at least one physical uplink control channel assignment policy indication indicating at least the change in one or more attributes for at least one physical uplink control channel resource indicates one of a change in channel quality information reporting period or scheduling request period, and the change in the one or more attributes for the at least one physical uplink control channel resource is implemented by implementing at least one physical uplink control channel assignment to an available physical resource block to change the channel quality information reporting period or scheduling request period via the at least one physical uplink control channel resource.

10. A method comprising:
  receiving, at an apparatus implementing at least part of a radio access network node, at least one notification from at least one radio access network node controller, the at least one notification caused to notify the apparatus of at least one physical uplink control channel assignment policy indication indicating at least a change in one or more attributes for at least one physical uplink control channel resource;
  implementing, by the apparatus for at least one user equipment associated with the apparatus, the change in the one or more attributes for the at least one physical uplink control channel resource at least by implementing at least one physical uplink control channel assignment to an available physical resource block based on the at least one physical uplink control channel assignment policy indication,
  wherein the indication indicating at least the change in the one or more attributes for at least one physical uplink control channel resource indicates a change in size of the at least one physical uplink control channel resource, and, in response to the change in the size, the change in the one or more attributes for the at least one physical uplink control channel resource is implemented by implementing at least one physical uplink control channel assignment to an available physical resource block to resize the at least one physical uplink control channel resource; and
  generating and transmitting by the apparatus at least one assignment notification to the at least one user equipment associated with the apparatus, the assignment notification caused to notify the at least one user equipment of the at least one physical uplink control channel assignment.

11. The method as claimed in claim 10, wherein the at least one notification further comprises an indicator conveying to the apparatus an urgency factor for the at least one physical uplink control channel assignment.

12. The method as claimed in claim 11, wherein the indicator conveying to the apparatus an urgency factor for the at least one physical uplink control channel assignment comprises one of:
  an indicator for indicating an assignment for the at least one physical uplink control channel resource for the at least one user equipment is to be performed immediately; or
  an indicator for indicating an assignment for the at least one physical uplink control channel resource for the at least one user equipment is to be performed after a determined time.

13. The method as claimed in claim 10, wherein the implementing at least one physical uplink control channel assignment based on the at least one physical uplink control channel assignment policy indication implements at least one of:
  assigning, reassigning, or both assigning and reassigning the at least one physical uplink control channel resource to the available physical resource block with a highest number of currently allocated physical resource allocations;
  assigning, reassigning, or both assigning and reassigning the at least one physical uplink control channel resource to the available physical resource block with a lowest number of currently allocated physical resource allocations;
  assigning, reassigning, or both assigning and reassigning the at least one physical uplink control channel resource to the available physical resource block to attempt to equalize currently allocated physical resource allocations between all available physical resource blocks;
  assigning, reassigning, or both assigning and reassigning the at least one physical uplink control channel resource to the available physical resource block which is contiguous with a currently used physical resource block; or
  assigning, reassigning, or both assigning and reassigning the at least one physical uplink control channel resource to the available physical resource block after a determined number of assignments or a determined number of reassignments or both a determined number of assignments and a determined number of reassignments are detected.

14. The method as claimed in claim 10, wherein the generating and transmitting further comprises:
  generating and broadcasting a system information broadcast message, the system information broadcast message comprising information associated with the at least one physical uplink control channel assignment; and
  generating and broadcasting a paging message, the paging message caused to notify the at least one user equipment of the system information broadcast message.

15. The method as claimed in claim 10, wherein the generating and transmitting further comprises:
  generating and unicasting a radio resource control message to the at least one user equipment, the radio resource control message comprising information associated with the at least one physical uplink control channel assignment.

16. The method as claimed in claim 10, further comprising providing,
  from the apparatus to the at least one radio access network node controller, a set of data and attributes related to facilitating at least sizing of the at least one physical uplink control channel resource, and wherein the receiving the at least one notification is in response to the providing the set of data and attributes.

17. The method as claimed in claim 10, wherein the at least one notification comprises an indicator conveying to the apparatus the at least one physical uplink control channel assignment policy indication, the indicator conveying to the apparatus the at least one physical uplink control channel assignment policy indication comprises at least one of:
  an indicator for minimizing a number of consumed physical resource blocks for the at least one physical uplink control channel assignment;
  an indicator for maximal filling of consumed physical resource blocks for the at least one physical uplink control channel assignment;
  an indicator for equally loading consumed physical resource blocks for the at least one physical uplink control channel assignment;
  an indicator for minimizing worst-case intra-cell interference for consumed physical resource blocks for the at least one physical uplink control channel assignment;
  an indicator for minimizing fragmentation of consumed physical resource blocks for the at least one physical uplink control channel assignment;

an indicator for minimize radio resource uplink control reconfigurations for the at least one physical uplink control channel assignment;

an indicator indicating that at least a first physical resource block is not allowed to be used for the at least one physical uplink control channel assignment; or an indicator indicating that at least a second physical resource block is allowed to be used for the at least one physical uplink control channel assignment.

18. A computer program product comprising a non-transitory computer-readable storage medium comprising program code that, when executed, cause an apparatus to perform:

receiving, at the apparatus implementing at least part of a radio access network node, at least one notification from at least one radio access network node controller, the at least one notification caused to notify the apparatus of at least one physical uplink control channel assignment policy indication indicating at least a change in one or more attributes for at least one physical uplink control channel resource;

implementing, by the apparatus for at least one user equipment associated with the apparatus, the change in the one or more attributes for the at least one physical uplink control channel resource at least by implementing at least one physical uplink control channel assignment to an available physical resource block based on the at least one physical uplink control channel assignment policy indication, wherein the indication indicating at least the change in the one or more attributes for at least one physical uplink control channel resource indicates a change in size of the at least one physical uplink control channel resource, and, in response to the change in the size, the change in the one or more attributes for the at least one physical uplink control channel resource is implemented by implementing at least one physical uplink control channel assignment to an available physical resource block to resize the at least one physical uplink control channel resource; and generating and transmitting by the apparatus at least one assignment notification to the at least one user equipment associated with the apparatus, the assignment notification caused to notify the at least one user equipment of the at least one physical uplink control channel assignment.

\* \* \* \* \*